United States Patent [19]

Hickey

[11] 4,269,375

[45] May 26, 1981

[54] HYBRID ANNULAR AIRSHIP

[76] Inventor: John J. Hickey, 93 Revere St., Boston, Mass. 02114

[21] Appl. No.: 89,883

[22] Filed: Oct. 31, 1979

[51] Int. Cl.³ .................... B64B 1/58; B64B 1/08; B64B 1/34
[52] U.S. Cl. .................... 244/26; 244/12.2; 244/30; 244/125; 244/127
[58] Field of Search .................... 244/12.1, 12.2, 23 C, 244/25, 30, 29, 26, 24, 39, 127, 125, 137 R, 115; 104/247; 114/261

[56] References Cited

U.S. PATENT DOCUMENTS

| | | | |
|---|---|---|---|
| 1,394,651 | 10/1921 | Tompkins | 104/247 |
| 1,567,703 | 12/1925 | Broyles | 244/115 |
| 1,572,120 | 2/1926 | Parker et al. | 244/30 |
| 1,712,529 | 5/1929 | Tallei | 244/39 |
| 3,321,156 | 5/1967 | McMasters | 244/12.2 |
| 3,391,652 | 7/1968 | Lauber | 104/247 |
| 3,820,744 | 6/1974 | Denton | 244/30 |
| 3,904,154 | 9/1975 | Jones | 244/115 |
| 4,014,483 | 3/1977 | MacNeill | 244/23 C |
| 4,120,468 | 10/1978 | Fischer | 244/12.2 |

FOREIGN PATENT DOCUMENTS

| | | | |
|---|---|---|---|
| 683653 | 4/1964 | Canada | 244/23 C |
| 99792 | 9/1964 | Denmark | 244/12.2 |
| 580657 | 6/1930 | France | 244/30 |
| 1511696 | 5/1978 | United Kingdom | 114/261 |

Primary Examiner—Galen L. Barefoot

[57] ABSTRACT

An airship has a gas-containing annulus contained by the circular base portion of framework the central portion of which extends above the annulus. The capacity of the annulus in accordance with one embodiment is such as to render buoyant a weight equal at least to the major portion of the light ship weight of the airship and in another embodiment, the annulus capacity is such as to render the airship buoyant with a maximum load. The central portion of the framework supports the load lifting propulsion system while the forward propulsion and the guidance systems ride on and are supported by tracks carried by the framework adjacent but above the annulus to travel 90° in either direction from a predetermined straight-ahead position.

14 Claims, 11 Drawing Figures

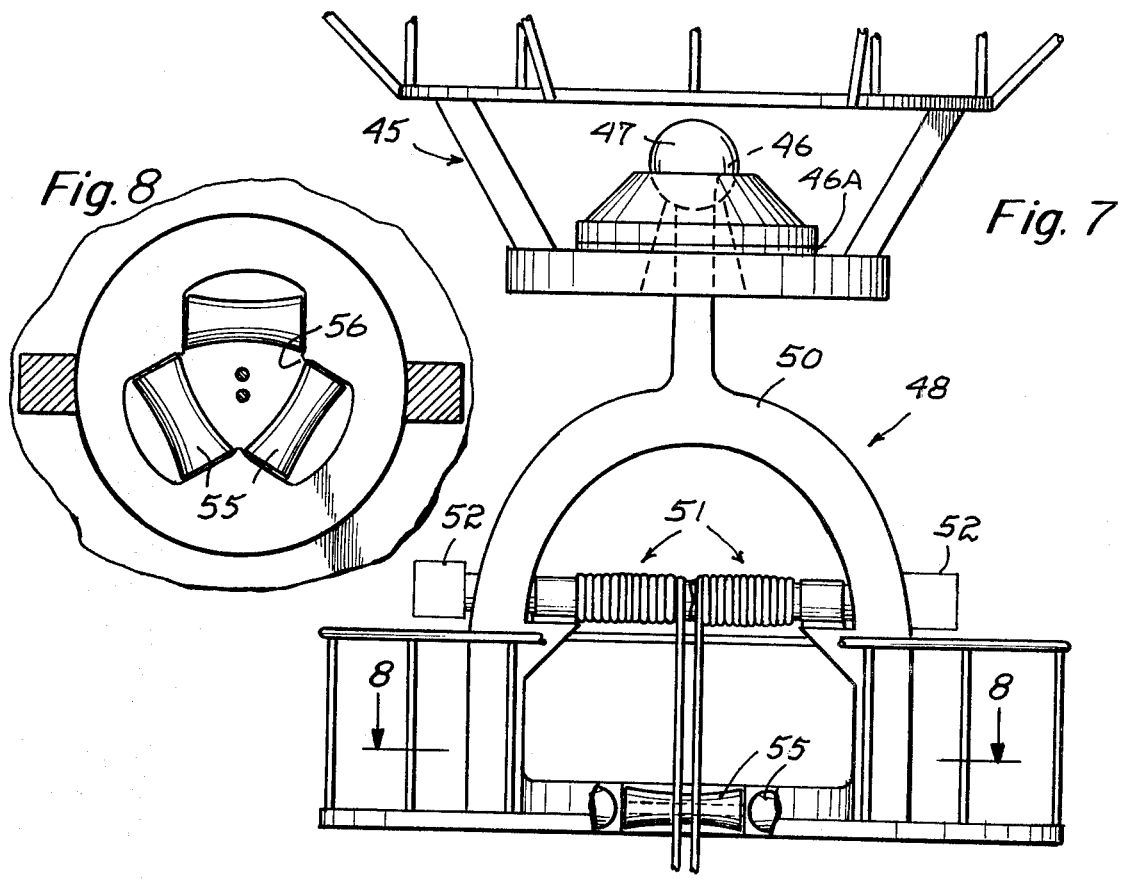
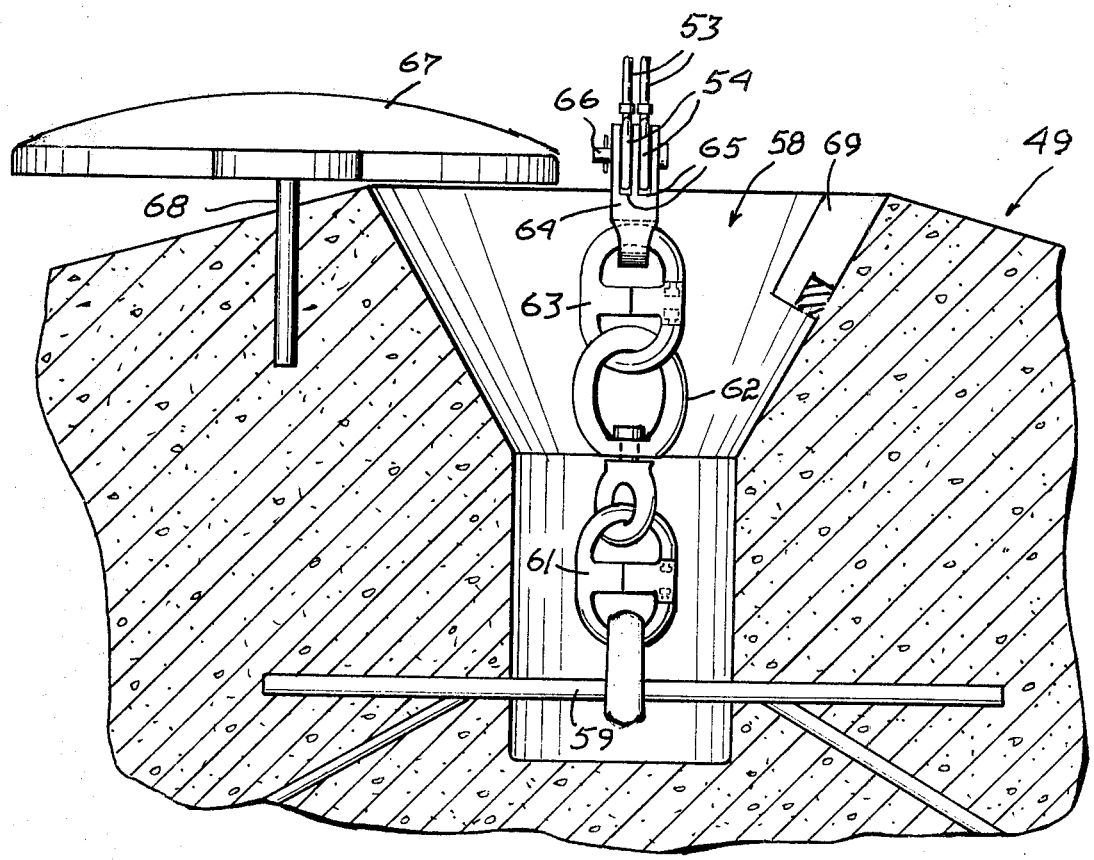

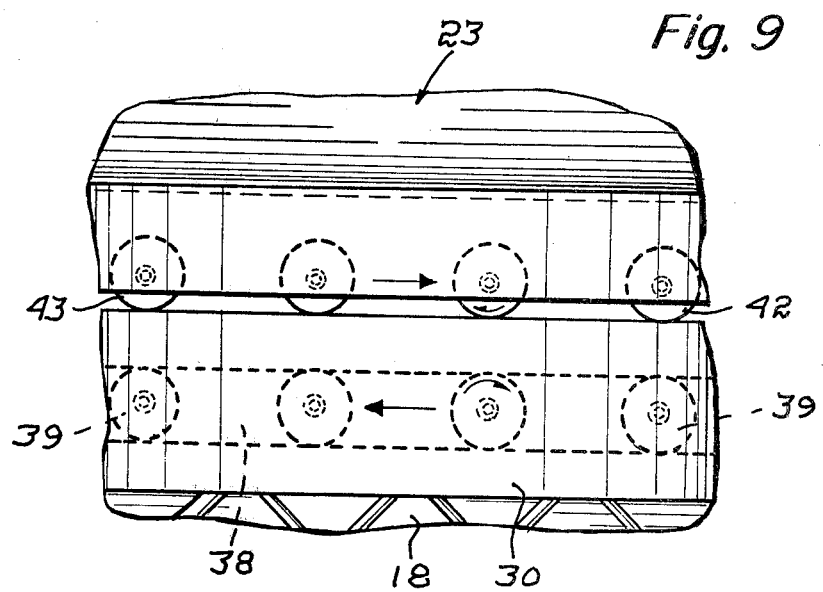

HYBRID ANNULAR AIRSHIP

BACKGROUND REFERENCES

U.S. Pat. No. 88,267
U.S. Pat. No. 1,256,670
New York Times—Nov. 23, 1975, Section 4, Page 5, "Up In the Air"
*The Illustrated London News*—July 7, 1970, "Airship Argosies Are the Answer"

BACKGROUND OF THE INVENTION

Helicopters have proved to be highly useful and efficient aircraft and are now capable of carrying substantial loads but the light ship weight of such aircraft is the principal factor on the load lifting capabilities of their propulsion systems.

While airships have the feature that they are buoyant with a predetermined maximum load, they are not as maneuverable as other aircraft and their mooring presents problems.

THE PRESENT INVENTION

The general objective of the present invention is to provide aircraft of a hybrid type combining the advantages of helicopters and air ships and eliminating disadvantageous features of each.

In accordance with the invention, the general objective is attained with an aircraft having a gas containing annulus contained by the circular base of a framework the central part of which is largely open and extends above the annulus, preferably in the form of a dome. The gas capacity of the annulus is in a range such that, at one extreme it is capable of supporting a weight equal to the major portion of the light ship weight of the airship and desirably close to that weight and at the other extreme it is capable of rendering the airship buoyant with its maximum load. The propulsion system of the aircraft is carried by the framework and renders the aircraft capable of vertical ascent, descent, and hovering in the manner of a conventional helicopter as well as horizontal flight in the manner of a conventional airship.

Another objective of the invention is to provide such an aircraft with unique maneuvering capabilities, an objective attained with the aircraft having tracks encircling the framework adjacent but above the annulus with the forward propulsion and guidance means carried by the track to travel therealong in either direction from a predetermined straight ahead position eliminating problems attendant banking.

Yet another objective of the invention is to enable large and heavy cumbersome objects to be transported, an objective attained with the framework, a dome, and with load lifting means carried thereby and operable to hold the lifted load centrally with respect to the annulus and close thereto.

Among the advantages of an airship in accordance with the invention is that it may be made, following known techniques used in the construction of conventional airships, capable of carrying much greater tonnage than present day helicopters and thus able to carry presently oversize and overweight prefabricated loads directly from the manufacturing or assembly site to the installation site without wear and tear on existing highways and bridges or the necessity of building additional roads and bridges to such a site. It is widely appreciated that the cost of just maintaining existing highways is enormous.

Not everyone is aware of the burdensome cost of building new highways and bridges or renovating existing highways and bridges, it is equally if not more important to equate highway constructions with their environmental impact. Such articles as "Our Bridges Are Falling Down", "Readers Digest", November 1978, and in the "Saturday Review" October 1978, "Farming the Amazon", are of interest in this connection. A highway represents a substantial acreage of destroyed forest or farmland to the extent it passes therethrough and an adequate highway through a tropical rain forest area, for example, to reach a mining site would be not only costly but would upset and seriously damage the ecology.

Another advantage of an airship in accordance with the invention is that it enables airships in accordance with the invention to be somewhat heavier than air while still retaining substantial advantages over conventional helicopters and airships, in that case to minimize mooring problems that are substantial in the case of conventional airships. Mooring masts are not needed and an airship in accordance with that embodiment, being heavier than air, can be moored directly to the ground by means of one or more securely embedded ground anchors and of types and constructions that in part depend on whether the mooring site is a temporary or permanent base.

While an airship in accordance with the invention is buoyant with a full load, its mooring is simplified since its undersurface is framework presenting a horizontal surface that may be seated on the ground and secured by short lines to an embedded anchor or anchors.

Other objectives, novel features and advantages of airships in accordance with the invention will be apparent from the description of the accompanying drawings and appended claims.

BRIEF DESCRIPTION OF THE DRAWINGS

The accompanying drawings illustrate a preferred embodiment of the invention of which—

FIG. 7 is a fragmentary view of the mooring apparatus, carried by the airship and the mooring anchor on the ground;

FIG. 8 is a section, on a further increase in scale, taken approximately along the indicated line 8—8 of FIG. 7;

FIG. 9 is a fragmentary view taken approximately along the indicated line 9—9 of FIG. 3;

THE PREFERRED EMBODIMENT OF THE INVENTION

Figure 1:
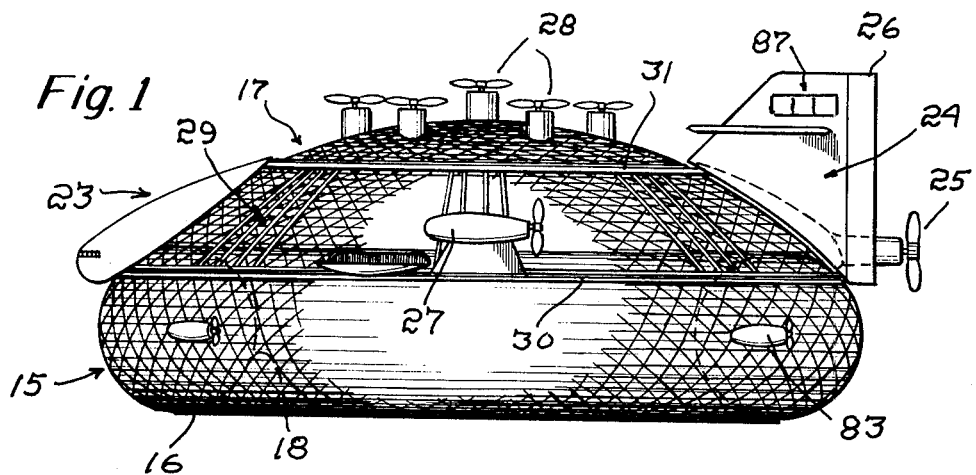
FIG. 1 is a somewhat schematic side elevation of an airship in accordance with the invention.

The airship schematically illustrated by the drawings has framework including an annular base portion 15 provided with a base plate 16 and a geodesic dome 17 where the framework is largely open. The annular portion 15 is not detailed other than to note, see FIG. 4, that it contains an annulus 18 containing a number of circumferentially arranged gas cells 19, a bottom, annular hold 20 provided with doors 21 and an upper catwalk 22. The framework desirably and as shown, is of the type described in the patent to Fuller U.S. Pat. No. 2,682,235.

The framework indirectly supports in a manner presently to be described a cabin 23, a unit 24 spaced 180° therefrom and provided with main forward propulsion engines 25 and rudders 26, and auxiliary engines 27 spaced 180° apart and 90° from the cabin 23 and of a type having reversibly pitched propellers. The framework also directly supports engines 28 with the axes of their propellers vertical thus to effect and control vertical ascent and descent. The lifting engines 28 are also of the type having reversibly pitched propellers.

The framework has encircling tracks for a carrier generally indicated at 29, the tracks including a lower, outer rail unit 30 and an upper inner rail unit 31. The carrier 29 also includes a series of radial supporting and retaining rods 32 interconnected by upper and lower rings 33.

Figure 3:
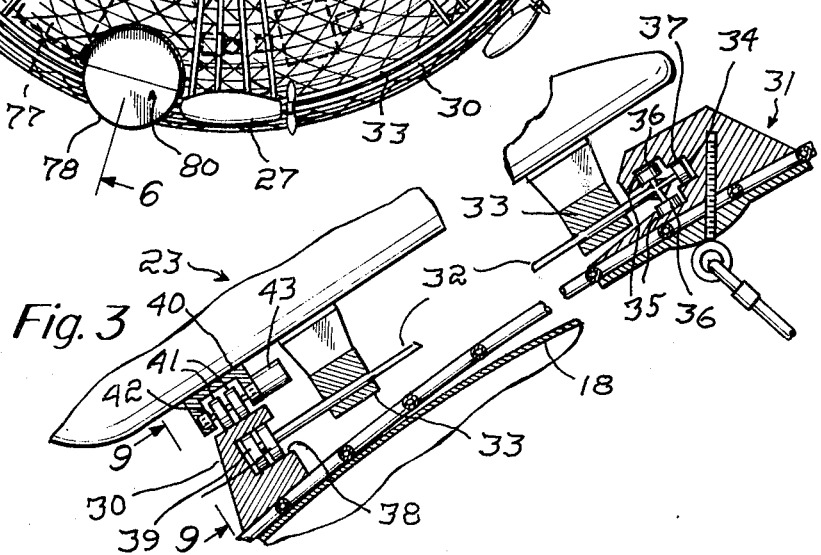
FIG. 3 is a section, on an increase in scale, taken approximately along the indicated line 3—3 of FIG. 2.

The upper rail unit 31 has, see FIG. 3, a channel 34 and mouth of which receives the upper, inner ends of the rods 32 and formed to provide upper and lower internal shoulders 35. Each rod 32 has wheels 36 in retaining engagement with the shoulders 35 and a wheel 37 supported by the bottom wall of the channel 34 which thus serves as a track. The lower rail unit 30 has a channel 38 in its inner side wall and the outer end of each rod 32 has wheels 39 retained within the channel 38 and supported by the bottom wall thereof which thus serves as a track.

The cabin 23, the unit 24 and the engines 27 are secured and supported by the rings 33 and each has a carriage 40, provided with a series of wheels 41 running on the top of the lower rail unit 30 which thus serves as a monorail with the wheels 41 supported by shafts 42. In the case of the carriage 40 of the cabin, one set of its shafts 42 is positively driven as by a reversible motor 43.

It is important to note that the gas capacity of the annulus cells 19 for any size of airship in accordance with the invention depends on wanted characteristics. At one extreme, the gas capacity is such that the light air ship weight of the airship is not entirely offset in which case, load lifting is effected by the engines 28 with mooring problems minimized. At the other extreme, the gas capacity of the annulus 19 is such that the ship is buoyant even with a predetermined maximum load in which case special mooring means are required. The lift afforded may be increased or decreased by varying the number of cells 19 wharged with helium.

Figure 4:
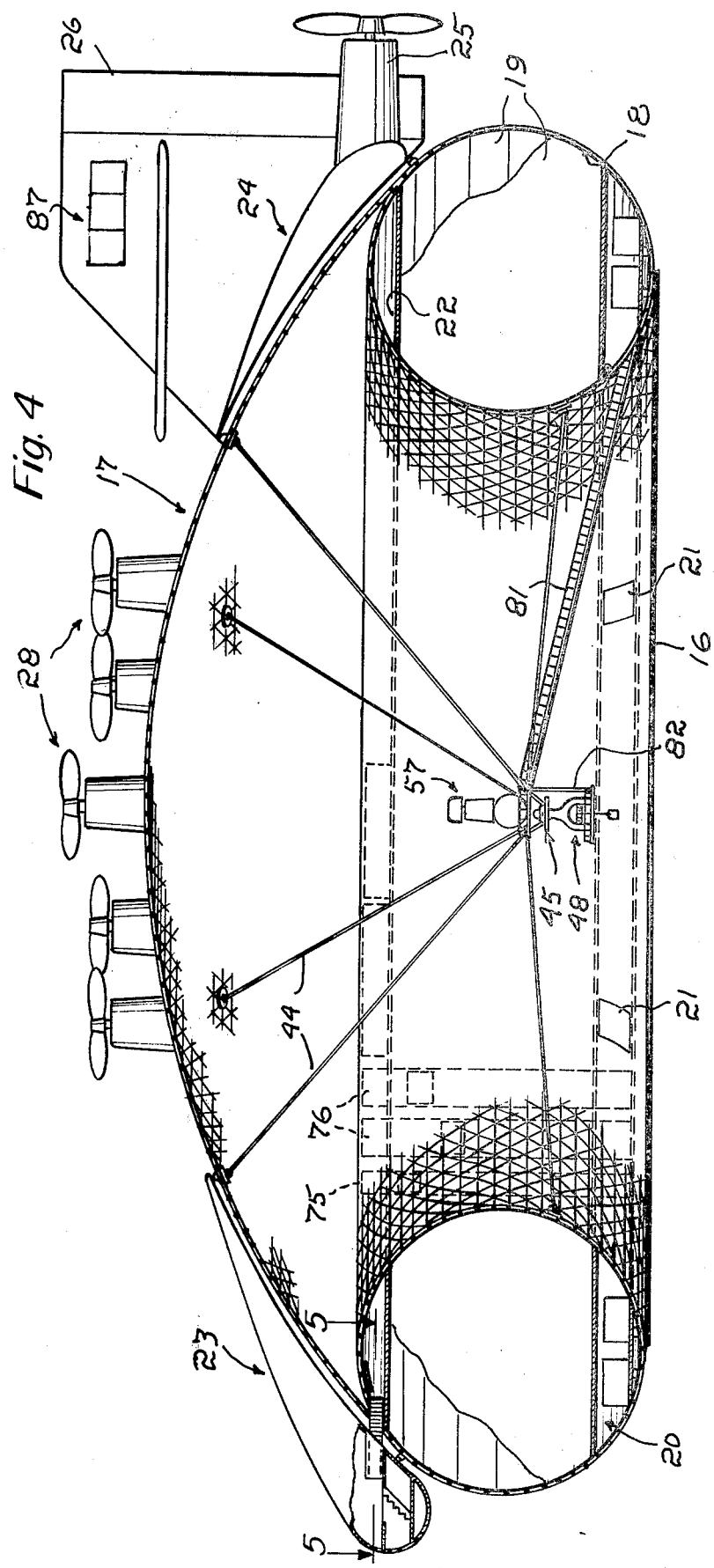
FIG. 4 is a fore and aft section, also on an increase in scale, schematically illustrating some interior features.

For mooring purposes and also for use in lifting and transporting heavy cargo units, the dome 17 has cables 44 connected to the framework, see FIGS. 4 and 7, and to a central mount 45 having a socket 46 for a ball 47 in support of a depending hoist, generally indicated at 48, and a rubber cushion 46A for use in lifting large and heavy unitary loads and which also may be used in mooring the airship, whether or not lighter than air, to a ground anchor, generally indicated at 49. The hoist 48 is shown as including a hanger 50 in the form of an inverted U and provided with parallel winches 51 operated by reversible drives 52 with the free end of each cable 53 provided with an eye splice 54. The hanger 50 has, see FIG. 8, three rollers 55 the axles of which are arranged so that the rollers provide a substantially triangular cable guide with intermediate projections 56 to ensure that the cables 53 come into central engagement with a roller 55. Power for the winch motors is or may be derived from a nuclear powered generator 57.

The permanent ground anchor 49 is of reinforced concrete and slopes upwardly gradually to the mouth of a central socket 58 having a transverse anchor 59 embedded in the concrete and carrying a heavy duty link 60 connected by a detachable link 61 to a swivel 62 which in turn is connected by a detachable link 63 to a hybrid link and shackle 64 having parallel slots 65, one for each eye splice 54 and a transverse bore to receive a clevis pin 66. A counter-balanced socket cover 67 is shown as mounted on a pivot 68 at one side of the socket 58. Except when the airship is moored to the ground anchor 49, the hybrid link and shackle 64 is positioned by a holder 68 so that the eye splices 54 when lowered, may be easily inserted into the slots of the shackle attached thereto and as easily disconnected therefrom. While the airship can be set down in a large field in the case of an emergency and then moored using ground anchors, the ground anchors may be of a rocket propelled type thus to enable them to be embedded in the ground from the aircraft while it is hovering.

Figure 2:
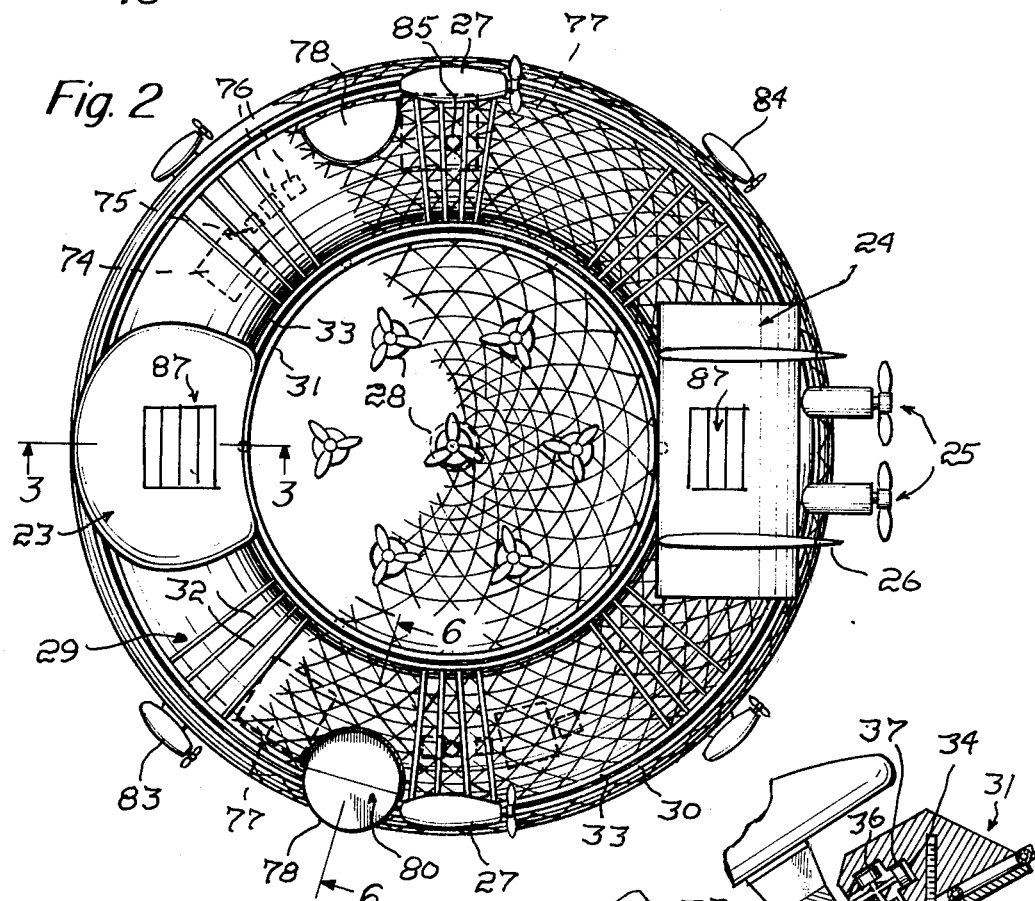
FIG. 2 is a top plan view of the airship.
Figure 5:
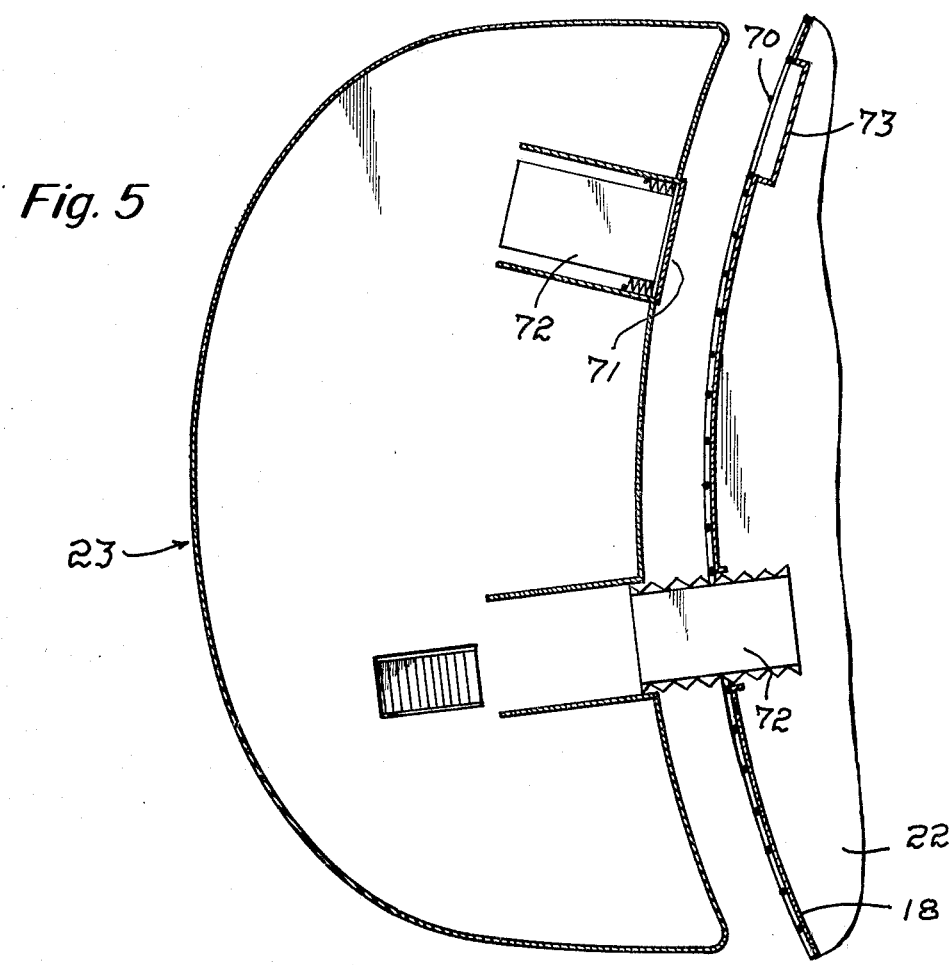
FIG. 5 is a section, on an increase in scale, taken approximately along the indicated line 5—5 of FIG. 4.
Figure 6:
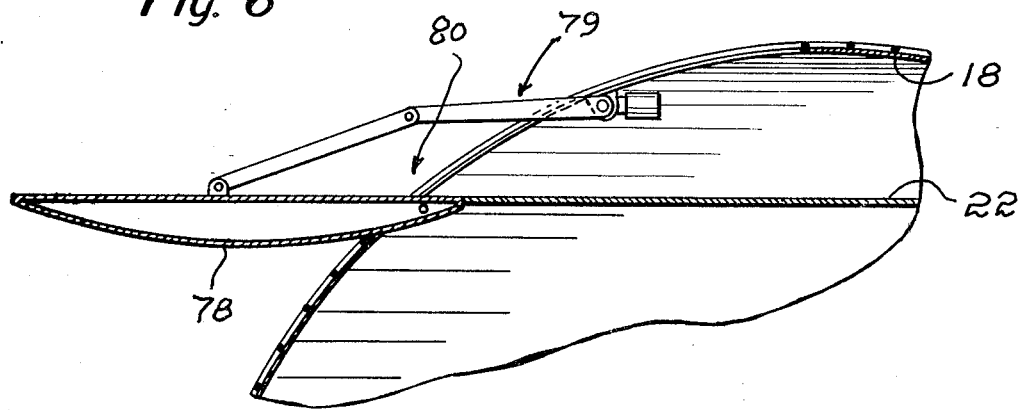
FIG. 6 is a section, on the scale of FIG. 5, taken approximately along the indicated line 6—6 of FIG. 2.
Figure 10:
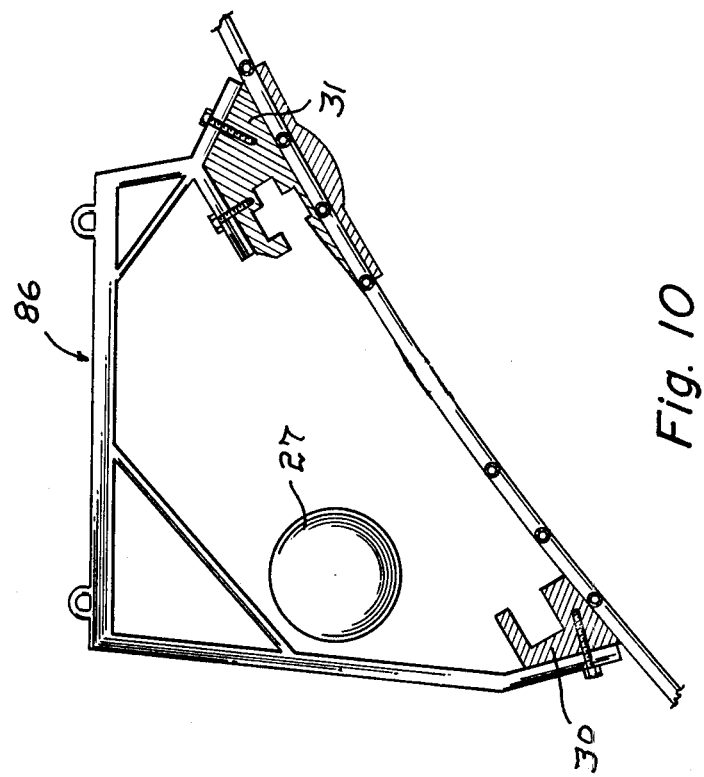
FIG. 10 is a fragmentary section illustrating the attachment of the tracks of a temporary mooring for use when assisting aircraft are needed in lifting oversize and overweight loads.

As access to the catwalk is necessary at all times and as the position of the cabin 23 may be changed from time to time, the annulus 18 has a series of ports 70 and the cabin 23 has doors 71 carried by an extendable walk 72 which can, see FIG. 5, be projected through that one of the ports 70 in alignment therewith, when its door 73 is opened either by one inside the annulus or by a conventional door opener operated from within the cabin 23, the door 71, then opened. Within the catwalk 22, there are for example, crew quarters 74, freight and passenger elevators 75 and 76, respectively, between the catwalk 22 and the hold 20. The catwalk 22 also includes, see FIGS. 2 and 6, hangers 77 for helicopters and large hinged closures 78 to be swung from a closed position into an open position, see FIG. 6, by means of the power operated linkage 79 in which they and the then exposed portions of the catwalk 22 establish temporary helipads generally indicated at 80.

The cargo space has a door, see FIG. 4, which, when open, permits access to the hoist 45 by means of a walkway 81 with a flexible ladder 82 permitting access to the hoist 48.

The use of the carrier 29 enables the direction of forward propulsion to be changed independently of the framework. In effecting the maneuver, the engines 27 are operated to effect opposite carrier turning thrusts and at the same time the appropriate ones of the small engines 83 or 84 carried by the framework below the path of the cabin 23 are employed to counter any tendency of the framework to turn with the carrier 29.

Figure 11:
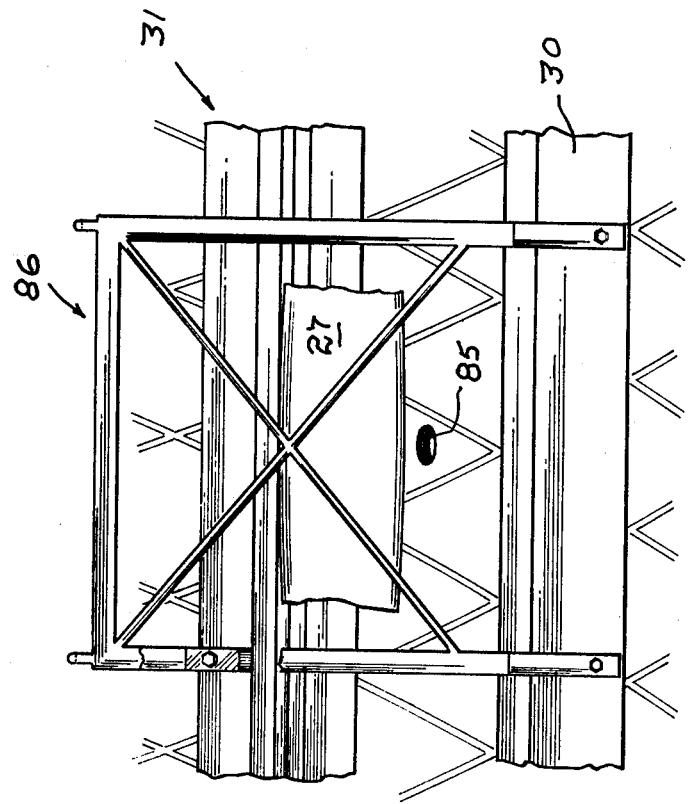
FIG. 11 is a front view of the attached, temporary mooring.

In the case of loads that present a problem because of their length and weight, a trestle, for example, provision is made for the passage of cables downwardly through the annulus 15 between cells 19. The passageways for such cables are indicated at 85 in FIGS. 2 and 11 and are in transverse alignment. When such a load is to be carried, platforms 86 are detachably attached to the rail units 30 and 31 above the cable passageways 85. While the platforms may be used to support winches if the load is a problem only because of its length, they also serve to enable aircraft to be moored thereto that are capable of providing lifting assistance when the load is overweight.

The airship is provided with solar cells 87 both for heat and power and the cabin 23 and the unit 24 are shown as provided with such cells.

I claim:

1. An airship including a gas-containing annulus including at least one gas-containing portion, a framework providing an annular base portion containing said annulus and an upwardly projecting central portion, said framework open in said central portion, a cabin and flight effecting and guidance means, annular means connecting said cabin and said flight effecting and guidance means to the upper surface of said framework adjacent the outer portion thereof, the capacity of said gas-containing portion at least such as to render buoyant a weight equal at least to the major portion of the light ship weight of the aircraft, and means operable to effect vertical flight of said airship supported by said central portion inwardly of said cabin and flight effecting and guidance means.

2. The airship of claim 1 in which said connecting means includes a circular track carried by the upper surface of said framework adjacent and parallel to said annulus and a carrier to which said cabin and flight effecting and guidance means are connected and which include means connected to said track and operable to hold the carrier thereon and to enable said carrier to travel therealong, and means to effect the turning of said carrier relative to said track.

3. The airship of claim 2 in which the track includes an upper, inner unit and a lower outer unit, and the carrier includes a series of radial rods, end wheels connected to said rods and means interconnecting said rods, said units having channels opening towards each other receiving and confining the wheels of the rods and providing rails therefor.

4. The airship of claim 3 in which the channel of the upper unit has shoulders extending lengthwise thereof and the upper ends of the rods is provided with wheels the axes of which are at right angles to the rods and which engage said shoulders as retaining rails and operable to hold the wheels within the lower channel out of contact with the bottom thereof.

5. The airship of claim 2 in which the means effecting the turning of the carrier include at least one propelling unit attached to the carrier means and operable to provide a turning thrust in one direction and at least one propelling unit attached to the framework and operable to provide an opposite thrust to prevent the turning of the framework with the carrier means.

6. The airship of claim 2 in which the annulus also includes an upper portion and ports, and the cabin has at least one door which may be brought into registry with an annulus port and an extendable walk that may be extended into a port on such registry.

7. The airship of claim 2 in which the annulus has two transversely aligned cable passageways extending downwardly therethrough for use with a load of a length greater than the inside diameter of the annulus.

8. The airship of claim 2 in which the annulus includes at least one section for the storage of a helicopter and having a port overlying a part of said section, a cover for said port, a connection between the cover and the outer portion of said section enabling said cover to be swung outwardly from a first position closing said port into a second position exposing said section and extending outwardly in the plane thereof, and means operable to swing said cover between said positions and to support said cover in said second position to establish with the uncovered portion of the section a landing or take-off pad for the helicopter.

9. The airship of claim 2 in which the annulus has two transversely aligned cable passageways extending downwardly therethrough for use with a load of a length greater than the inside diameter of the annulus, and a pair of mooring platforms attachable to said track, one above each cable passageway, each said platform for use by an assisting aircraft in lifting such a long load.

10. The airship of claim 1 in which the upwardly projecting portion of the framework is in the form of a geodesic dome.

11. The airship of claim 10 and winch means including at at least one winch and a series of radial members connected to said means and to the central portion of the framework supporting said winch means above a plane inclusive of the bottom of the base portion of the framework.

12. The airship of claim 11 in which said winch means includes a mount to which the radial members are connected, a hoist by which the winch is supported, and a universal connection between the mount and the hoist.

13. The airship of claim 11 and a mooring site including a ground anchor of reinforced concrete having a relatively deep socket the upper portion of which is outwardly flared, an anchor embedded in the concrete and extending transversely of the socket, linkage connected to the transverse anchor and including a shackle at the free end of the linkage to which a cable from said winch means is to be connected during mooring and an intermediate swivel, and means adjacent the upper end of the flared portion of the socket operable to receive and hold the upper end of said linkage when the mooring site is not in use.

14. The airship of claim 13 in which there are two like winches and the free end of each cable is provided with an eye splice and the shackle is a hybrid link and shackle having a pair of slots with a transverse bore intersecting them, one slot for each eye splice, and a clevis pin extending through the transverse bore and securing the eyes when located in the slots.

* * * * *